US012716737B2

(12) United States Patent
Keserich et al.

(10) Patent No.: US 12,716,737 B2
(45) Date of Patent: Aug. 25, 2026

(54) METHODS AND SYSTEMS FOR GENERATING MAP DATA

(71) Applicant: HERE Global B.V., Eindhoven (NL)

(72) Inventors: Brad Keserich, Chicago, IL (US); Steve O'Hara, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 287 days.

(21) Appl. No.: 18/089,300

(22) Filed: Dec. 27, 2022

(65) Prior Publication Data

US 2024/0210196 A1 Jun. 27, 2024

(51) Int. Cl.

| | |
|---|---|
| ***G08G 1/00*** | (2006.01) |
| ***G01C 21/34*** | (2006.01) |
| ***G01C 21/36*** | (2006.01) |
| ***G05D 1/02*** | (2020.01) |
| ***G06F 16/29*** | (2019.01) |

(52) U.S. Cl.
CPC ..... *G01C 21/3617* (2013.01); *G01C 21/3641* (2013.01); *G01C 21/3664* (2013.01); *G01C 21/3697* (2013.01)

(58) Field of Classification Search
None
See application file for complete search history.

(56) References Cited

U.S. PATENT DOCUMENTS 10,036,650 B2 * 7/2018 Chintakindi ......... G08G 1/0129
10,324,463 B1 6/2019 Konrardy et al.
10,331,124 B2 6/2019 Ferguson et al.
2013/0101159 A1 4/2013 Chao et al.
2019/0049264 A1 * 2/2019 Malkes ................ G08G 1/0116
2019/0146508 A1 * 5/2019 Dean .................... G05D 1/0285 701/26
2019/0213873 A1 * 7/2019 Adireddy ............ G08G 1/0116
2019/0219409 A1 7/2019 Tan et al.
2023/0266139 A1 * 8/2023 Cserna .............. G01C 21/3617

FOREIGN PATENT DOCUMENTS

WO 2010040403 A1 4/2010

OTHER PUBLICATIONS

Alahi et al., "Social Lstm: Human Trajectory Prediction in Crowded Spaces", 2016 IEEE Conference on Computer Vision and Pattern Recognition (CVPR), 2016, retrieved from https://openaccess.thecvf.com/content_cvpr_2016/papers/Alahi_Social_LSTM_Human_CVPR_2016_paper.pdf, pp. 961-971.

* cited by examiner

*Primary Examiner* — Adam D Tissot
*Assistant Examiner* — Michael T Silva
(74) *Attorney, Agent, or Firm* — DITTHAVONG, STEINER & MLOTKOWSKI

(57) ABSTRACT

The disclosure provides a method, a system, and a computer program product for generating map data. The method comprises obtaining, from one or more user equipment, user preference data associated with a region, wherein the user preference data is associated with an indication of at least one of routing of traffic through a region or not routing of traffic through the region. The method may further include calculating, by a processor, an aggregate value for the region based on the obtained user preference data and generating map data indicative of the calculated aggregate value for the region.

14 Claims, 6 Drawing Sheets

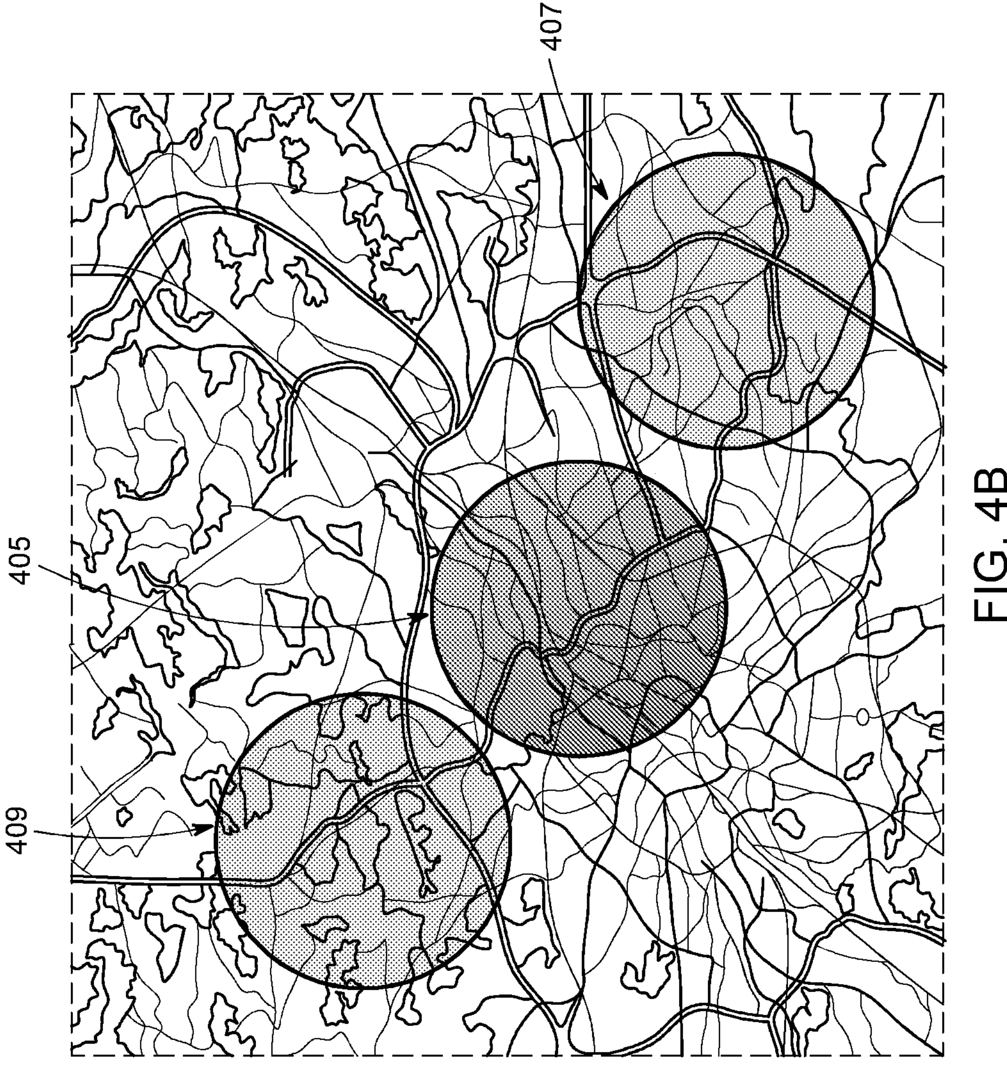
FIG. 4B
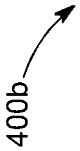

METHODS AND SYSTEMS FOR GENERATING MAP DATA

TECHNOLOGICAL FIELD

The present disclosure generally relates to routing and navigation applications, and more particularly relates to systems and methods for generating map data.

BACKGROUND

Various navigation applications are available to aid a user during navigation, for example by providing directions for driving, walking, or other modes of travel. Web-based and mobile app-based systems offer navigation applications that allow a user to request directions from one point to another. Often, a route traversed or to be traversed by a user encompasses areas such as residential areas, hospital, schools, mall, and market on the way. These areas may cause road congestion as human movement in these areas is very high. In many cases, a lot of safety concerns may arise in these specific regions which are prone to more pedestrian traffic. For example, if a region in vicinity of a mall encounters a lot of unregulated pedestrian traffic, passage of vehicles through the region, especially at high speed, could pose a serious risk to pedestrians. Further, in regions where many children are observed near a school, or congestion is observed near a market, passage of vehicles can pose a threat to the safety of pedestrians in general.

Therefore, it is required to be able to manage traffic better in certain regions which are more prone to pedestrian traffic or have special requirements related to passage of traffic, such as regions near schools, hospitals, busy market intersections and the like.

BRIEF SUMMARY

Accordingly, in order to provide accurate, safe, and reliable navigation assistance, it is important to generate map data which can take consideration of the region for which the map data is generated. Further, is a user can be provided a capability to themselves define their preferences related to passage of traffic through the region, and such preferences can be aggregated after being collected from multiple users, even more safe and user oriented navigation services can be provided to the end users. To this end, the data utilized for providing the navigation assistance should consider user preference, such in the form of a user vote, and provide safe, accurate and up-to-date navigation instructions for passage of vehicle through various regions. To that end, certain regions which are prone to congestion due large amount of pedestrian traffic, such as regions near schools, residential areas, parks, hospitals and the like, may be avoided while generating navigation instructions for vehicles. Especially, in the context of navigation assistance for autonomous vehicles and semi-autonomous vehicles to avoid inaccurate navigation, it is important that the assistance provided is real-time, up-to-date, safe, and accurate. There is a need of a system that may avoid congested areas and allow users to specify their preferences related to passage of traffic through a region, so that while generating navigation instructions for vehicles in general, user preferences can be factored in and accordingly navigation routes may be generated. Example embodiments of the present disclosure provide a system, a method, and a computer program product for generating map data in order to overcome the challenges discussed above, to provide the solutions envisaged as discussed above.

Some example embodiments disclosed herein provide a method for generating map data. The method comprises obtaining, from one or more user equipment, user preference data associated with a region, wherein the user preference data is associated with an indication of at least one of routing of traffic through a region or not routing of traffic through the region. The method may further include calculating, by a processor, an aggregate value for the region based on the obtained user preference data and generating map data indicative of the calculated aggregate value for the region.

According to some example embodiments, the method further comprises generating a navigation instruction based on the generated map data.

According to some example embodiments, generating the navigation instruction comprises comparing the aggregate value for the region with a threshold aggregate value. Further, the navigation instruction is generated for at least one of the routing of traffic through the region or not routing of the traffic through the region based on the comparison, wherein the traffic is routed through the region when the aggregate value for the region is lesser than the threshold aggregate value and the traffic is not routed through the region when the aggregate value is greater than the threshold aggregate value.

According to some example embodiments, obtaining the user preference data comprises: providing, to the one or more user equipment, a 2D map for displaying on a user interface associated with the user equipment. Further, at least one marked-up location is received from the one or more user equipment on the 2D map. The at least one marked-up location comprises: one or more markers placed on a location associated with the region, displayed on the 2D map. Further, an output contribution value is assigned to the user preference data based on the received marked-up location.

According to some example embodiments, the output contribution value is a predetermined positive value, which is associated with a marked circular region having a predefined radius and wherein the marked circular region is centered around the at least one marked-up location.

According to some example embodiments, the method further comprises calculating the aggregate value for the region based on the output contribution value.

According to some example embodiments, receiving, from the one or more user equipment, at least one marked-up location on the 2D map comprises determining area budget data associated with a user of the one or more user equipment. Further, the at least one marked-up location on the 2D map is received based on the determined area budget data associated with the user, wherein the user is allowed to place one or more markers on the location associated with the at least one marked-up location when the area budget data is more than a threshold area budget value.

According to some embodiments, indication of at least one of routing of traffic through a region or not routing of traffic through the region comprises a vote value for not routing of traffic through the region, wherein the vote value comprises a positive mathematical value.

According to some embodiments, generating map data indicative of the calculated aggregate value for the region further comprises generating a heatmap indicative of the calculated aggregate value for each of a plurality of map regions, wherein the plurality of map regions comprises the region. The generated heatmap may then either be transmitted to the one or more user equipment or may be used to generate the navigation instruction. The heatmap may also be used to suppress the navigation instruction for a particular region based on the aggregate value for the region.

Some example embodiments disclosed herein provide a system for generating map data, the system comprising a memory configured to store computer-executable instructions and one or more processors configured to execute the instructions to obtain, from one or more user equipment, user preference data associated with a region, wherein the user preference data is associated with an indication of at least one of routing of traffic through a region or not routing of traffic through the region. The one or more processors are further configured to calculate, an aggregate value for the region based on the obtained user preference data and generate map data indicative of the calculated aggregate value for the region Some example embodiments disclosed herein provide a computer programmable product comprising a non-transitory computer readable medium having stored thereon computer executable instruction which when executed by one or more processors, cause the one or more processors to carry out operations for generating map data. The operations further comprise obtaining, from one or more user equipment, user preference data associated with a region, wherein the user preference data is associated with an indication of at least one of routing of traffic through a region or not routing of traffic through the region. The operations further comprise calculating an aggregate value for the region based on the obtained user preference data and generating map data indicative of the calculated aggregate value for the region.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
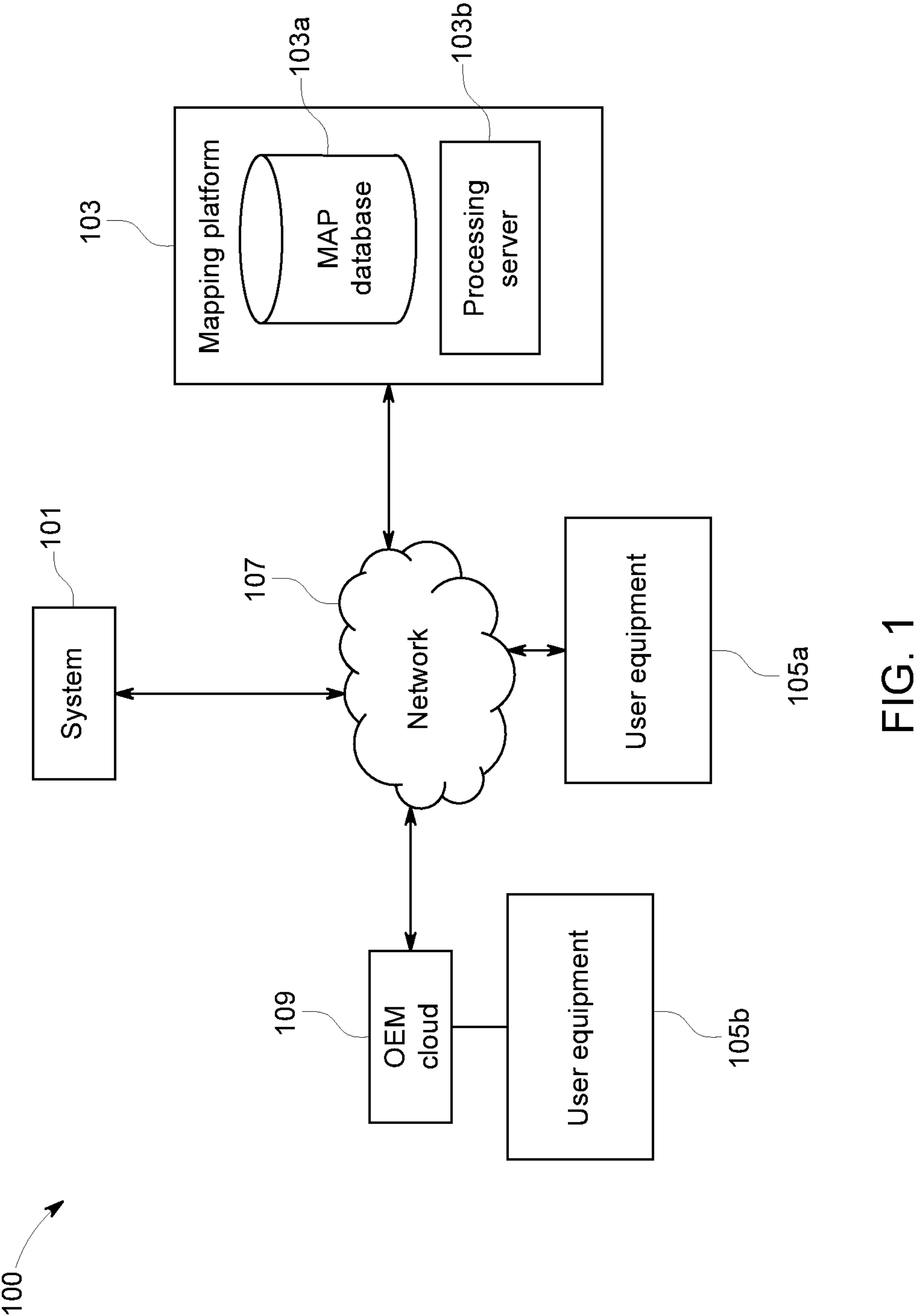
Figure 2:
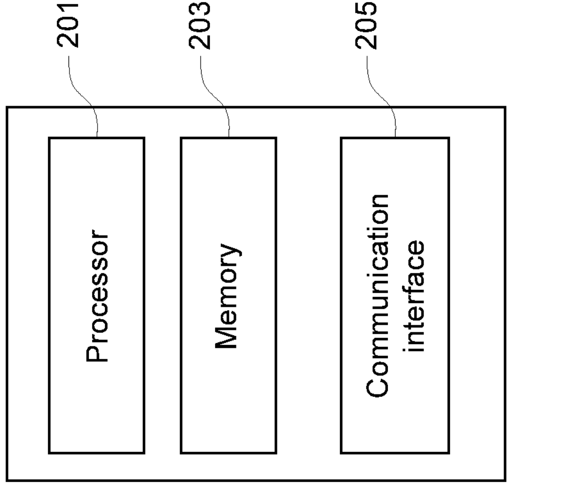
Figure 3:
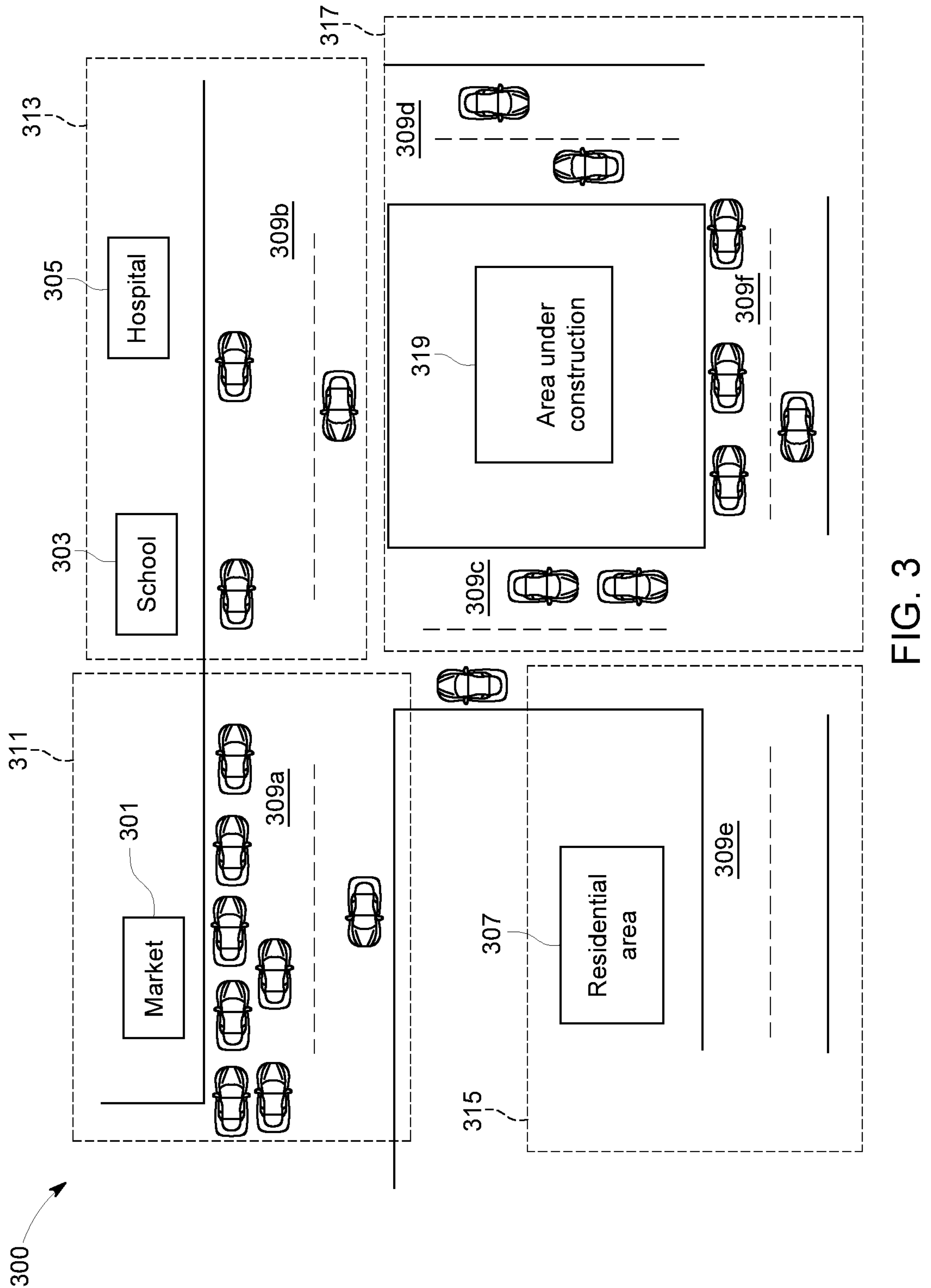
Figure 4A:
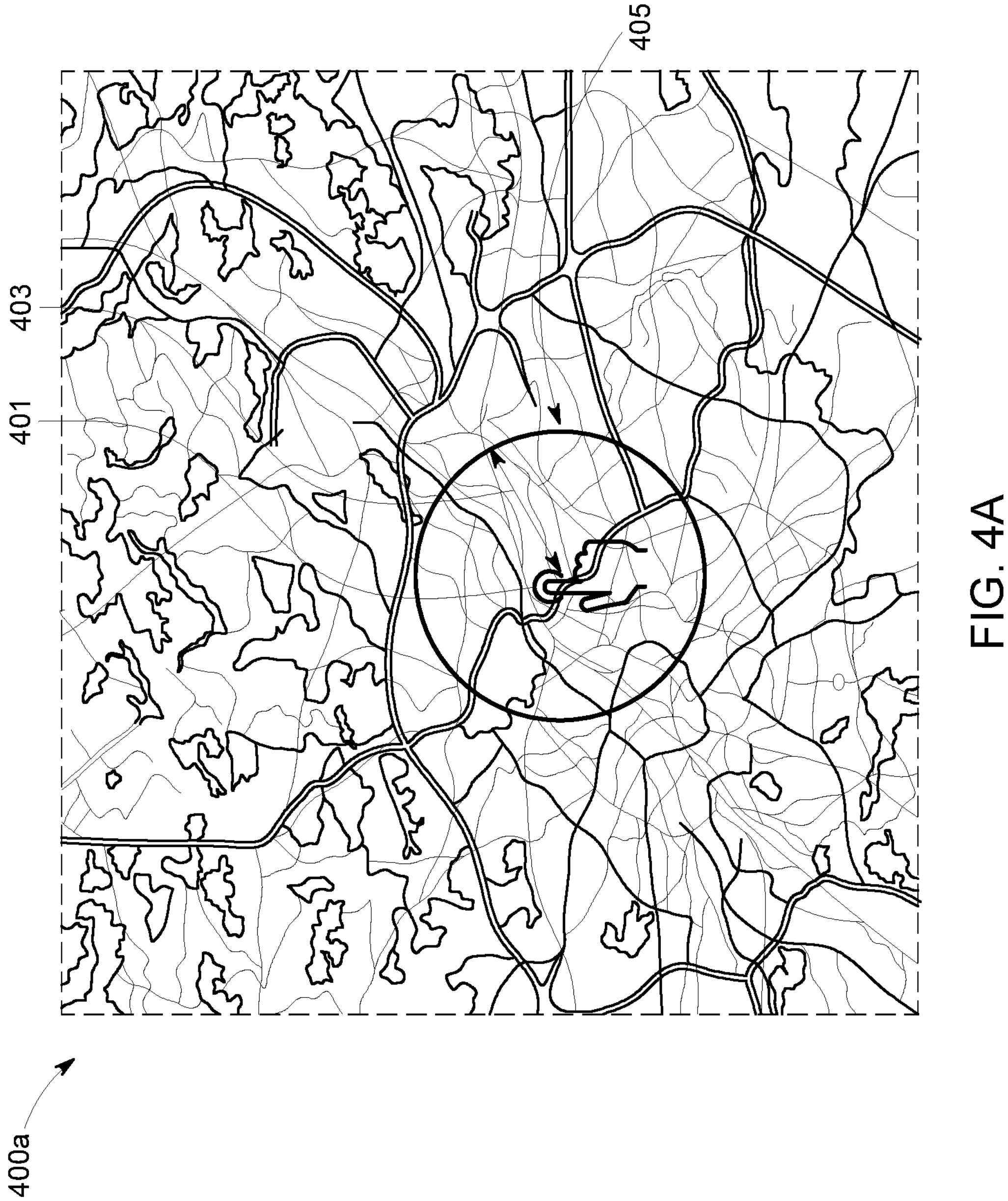
Figure 5:
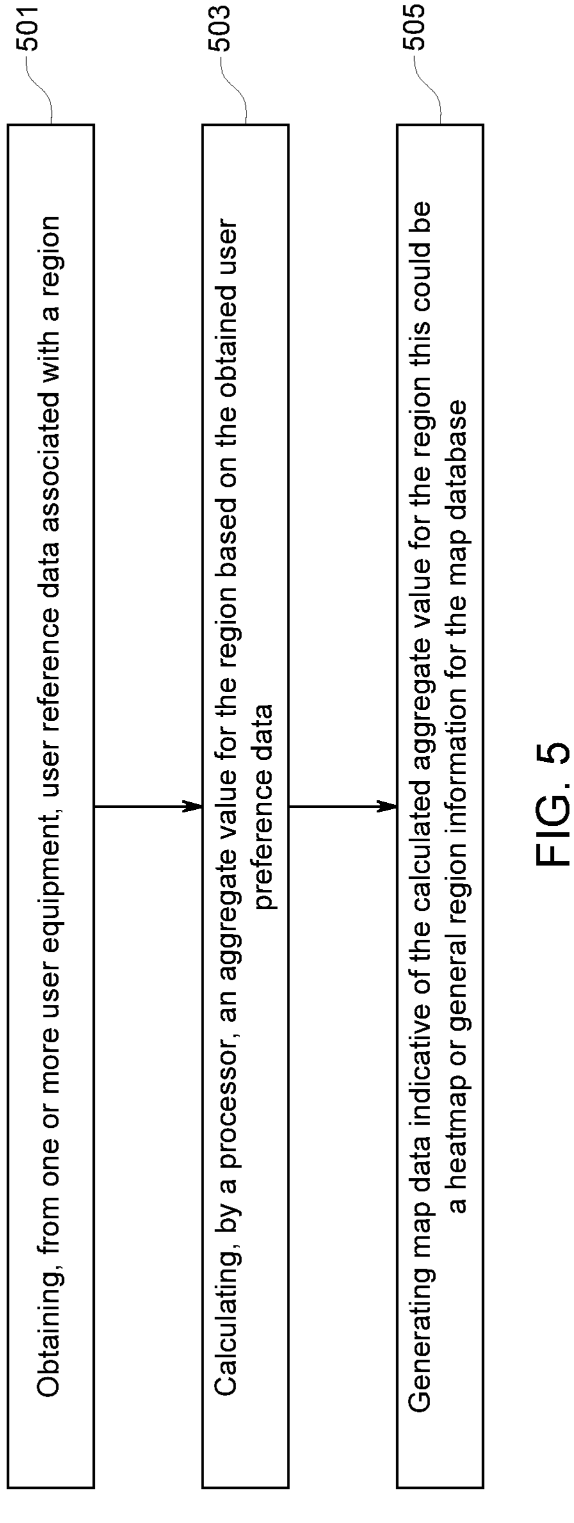

Having thus described example embodiments of the invention in general terms, reference will now be made to the accompanying drawings, which are not necessarily drawn to scale, and wherein:

FIG. 1 illustrates a schematic diagram of a network environment of a system for generating map data, in accordance with an example embodiment:

FIG. 2 illustrates a block diagram of the system for generating map data, in accordance with an example embodiment:

FIG. 3 illustrates an exemplary scenario of a working example of the system for generating map data, in accordance with an example embodiment:

FIG. 4A illustrates an exemplary user interface for receiving user preference data, in accordance with an example embodiment:

FIG. 4B illustrates an exemplary user interface for displaying a heatmap of regions in accordance with an example embodiment: and FIG. 5 illustrates a flow diagram of a method for generating map data, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein: rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry): (b) combinations of circuits and computer program product(s) comprising software and/or firmware instructions stored on one or more computer readable memories that work together to cause an apparatus to perform one or more functions described herein: and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "heat map (or heatmap)" may be used to refer to a map showing or storing information about different entities associated with different amount of a data parameter using varying shapes, patterns, colors, intensities, numerical values, and the like. In some cases, heat map shows variation of volume for data parameter. In some cases, heat map shows data visualization associated with variation of magnitude of a phenomenon as color in two dimensions. With reference to the present disclosure, the heat map may be used to show or store variation of traffic in different regions associated with a geographic map.

The term "route" may be used to refer to a path from a source location to a destination location on any link.

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car, or autonomous car. For example, the vehicle may have zero passengers or passengers that do not manually drive the vehicle, but the vehicle drives and maneuvers automatically. There can also be semi-autonomous vehicles.

End of Definitions

Embodiments of the present disclosure may provide a system, a method, and a computer program product for generating map data. The map data may be associated with a region, such as a residential area, a school, a market, a hospital, and the like. These regions may face safety challenges due to traffic being routed to these regions by various navigation services, such as navigation apps. Such traffic may be bothersome, dangerous, and unnecessary for users visiting or residing in such regions due to a number of reasons. This traffic could be more optimized if the users, such as residents of an area, had the ability to vote on traffic redirection. To that end, it would be advantageous to provide methods and systems that facilitate users in specifying their preferences related to routing of traffic through specific regions. The methods and systems disclosed herein provide the users an ability to redirect traffic in their regions of interest based on their preference. The preferences of the users are gathered in form of user preference data associated with a region. The user preference data may be submitted in the form of a vote of the user indicating whether they want routing of traffic through the region or not. Each vote is given a predetermined positive value, such as "+1" for one vote. Like this, user preference data for the region may be obtained from a number of users and then this data is aggregated to calculate total number of votes for a particular region. This may be done for all regions in a map of a geographical area. Accordingly, a region with high votes, measured by a high aggregate value (which may be measured against a predetermined threshold number of votes or a threshold aggregate value) is considered to be a "no-go" zone. Such "no-go" zones may be removed from consideration while routing of traffic through an area or at time of generation of navigation routes and instructions by a mapping service provider.

In some embodiments, the user preference data is used to generate a heatmap of votes, where each vote can be placed on a 2D map comprising a plurality of regions. Further, each vote is accounted as a deterrent marker, to deter navigation apps from routing traffic through regions with high votes. To that end, the aggregation of vote values is used to generate map data indicative of vote values for different regions, which is further used while generating navigation instructions by a navigation app for various vehicle using the navigation app. For example, before generating the navigation instruction for a vehicle, the navigation app may be configured to compare aggregate vote value for a region with the threshold aggregate value. And then, based on the comparison, the navigation instruction is generated. Further, based on the comparison, the navigation instruction may be suppressed, that is to say, routing of traffic through the region is avoided. Specifically, the traffic is routed through the region when the aggregate value for the region is lesser than the threshold aggregate value and the traffic is not routed through the region when the aggregate value is greater than the threshold aggregate value.

In this manner, the methods and systems disclosed herein may provide efficient and user friendly techniques for routing of traffic through the region. Further, as most of the processing may be done by the navigation app, which may be maintained as any of a remote server based or cloud based server, the user may be able to leverage fast processing and improved storage benefits provided by the systems and methods disclosed herein. Further, data for generating navigation instructions using the methods and systems disclosed herein may be gathered through a number of techniques, such as crowdsourcing, historical map data usage, real time data from map service providers and the like. Thus, the navigation instructions may be generated based on up-to-date and real time data, providing accurate and reliable navigation services to the users. These and other technical improvements of the invention will become evident from the description provided herein.

The system, the method, and the computer program product facilitating generating map data are described with reference to FIG. 1 to FIG. 5.

FIG. 1 illustrates a schematic diagram of a network environment 100 of a system 101 for generating map data, in accordance with an example embodiment. The system 101 may be communicatively coupled to a mapping platform 103, a user equipment 105*a* and an OEM (Original Equipment Manufacturer) cloud 109 connected to a user equipment 105*b*, via a network 107. The components described in the network environment 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In an example embodiment, the system 101 may be embodied in one or more of several ways as per the required implementation. For example, the system 101 may be embodied as a cloud based service, a cloud based application, a remote server based service, a remote server based application, a virtual computing system, a remote server platform or a cloud based platform. As such, the system 101 may be configured to operate outside the user equipment 105*a* and/or 105*b*. However, in some example embodiments, the system 101 may be embodied within one or both of the user equipment 105*a* and the user equipment 105*b*, for example as a part of an in-vehicle navigation system, a navigation app in a mobile device and the like. In each of such embodiments, the system 101 may be communicatively coupled to the components shown in FIG. 1 to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. In an embodiment, the system 101 may be deployed in a consumer vehicle to generate routing information in a region. Further, in one embodiment, the system 101 may be a standalone unit configured to generate routing information in the region for the autonomous vehicle. Alternatively, the system 101 may be coupled with an external device such as the autonomous vehicle. In some embodiments, the system 101 may be a server 103*b* of the mapping platform 103 and therefore may be co-located with or within the mapping platform 103. In some other embodiments, the system 101 may be an OEM (Original Equipment Manufacturer) cloud, such as the OEM cloud 109. The OEM cloud 109 may be configured to anonymize any data received from the system 101, such as the vehicle, before using the data for further processing, such as before sending the data to the mapping platform 103. In some embodiments, anonymization of data may be done by the mapping platform 103.

The mapping platform 103 may comprise a map database 103*a* for storing map data and a processing server 103*b*. The map database 103*a* may store node data, road segment data, link data, point of interest (POI) data, link identification information, heading value records, data about various geographic zones, regions, pedestrian data for different regions, heatmaps or the like. Also, the map database 103*a* further includes speed limit data of different lanes, cartographic data, routing data, and/or maneuvering data. Additionally, the map database 103*a* may be updated dynamically to cumulate real time traffic data. The real time traffic data may be collected by analyzing the location transmitted to the mapping platform 103 by a large number of road users through the respective user devices of the road users. In an embodiment, the real time traffic data may also include human traffic data that is data associated with pedestrian traffic in the region. For example, human traffic data may be captured via surveillance cameras, cell phone traces, and the like and may be used to create human traffic heat maps to be used as zones. For example, human traffic data may include that the density of pedestrian data is high in or outside a school in particular hours of a day, traffic near a hospital is more, or traffic in a park is more in morning and evening, or traffic is least on a highway during certain times of day which are not office hours and during specific days, and the like. In one example, by calculating the speed of the road users along a length of road, the mapping platform 103 may generate a live traffic map, which is stored in the map database 103*a* in the form of real time traffic conditions. In an embodiment, the map database 103*a* may store data of different zones in a region. The data of different zones in the region may include all the information associated with that zone such as, but not limited to, POI in the zones such as location of different residential areas, location of different educational institutes or a hospital, plurality of roads in the zone, and the like. In one embodiment, the map database 103*a* may further store historical traffic data that includes travel times, average speeds and probe counts on each road or area at any given time of the day and any day of the year. In an embodiment, the map database 103*a* may store the probe data over a period of time for a vehicle to be at a link or road at a specific time. The probe data may be collected by one or more devices in the vehicle such as one or more sensors or image capturing devices or mobile devices. In an embodiment, the probe data may also be captured from connected-car sensors, smartphones, personal navigation devices, fixed road sensors, smart-enabled commercial vehicles, and expert monitors observing accidents and construction. In an embodiment, the map data in the map database 103*a* may be in the form of map tiles. Each map tile may denote a map tile area comprising plurality of road segments or links in it.

According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network used by vehicles such as cars, trucks, buses, motorcycles, and/or other entities. Optionally, the map database 103*a* may contain path segment and node data records, such as shape points or other data that may represent pedestrian paths, links, or areas in addition to or instead of the vehicle road record data, for example. The road/link and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 103*a* may also store data about the POIs and their respective locations in the POI records. The map database 103*a* may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103*a* may include event data (e.g., traffic incidents, construction activities, scheduled events, unscheduled events, accidents, diversions etc.) associated with the POI data records or other records of the map database 103*a* associated with the mapping platform 103. Optionally, the map database 103*a* may contain path segment and node data records or other data that may represent pedestrian paths or areas in addition to or instead of the autonomous vehicle road record data.

In some embodiments, the map database 103*a* may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, navigation instruction generation and other functions, by a navigation device, such as by the user equipment 105*a* and/or 105*b*. The navigation-related functions may correspond to vehicle navigation, pedestrian navigation, navigation instruction suppression, navigation instruction generation based on user preference data or other types of navigation. The compilation to produce the end user databases may be performed by a party or entity separate from the map developer. For example, a customer of the map developer, such as a navigation device developer or other end user device developer, a navigation app service provider and the like may perform compilation on a received map database in a delivery format to produce one or more compiled navigation databases.

As mentioned above, the map database 103*a* may be a master geographic database, but in alternate embodiments, the map database 103*a* may be embodied as a client-side map database and may represent a compiled navigation database that may be used in or with end user equipment such as the user equipment 105*a* and/or the user equipment 105*b* to provide navigation and/or map-related functions. For example, the map database 103*a* may be used with the user equipment 105*a* and/or the user equipment 105*b* to provide an end user with navigation features. In such a case, the map database 103*a* may be downloaded or stored locally (cached) on the user equipment 105*a* and/or the user equipment 105*b*.

The processing server 103*b* may comprise processing means, and communication means. For example, the processing means may comprise one or more processors configured to process requests received from the user equipment 105*a* and/or the user equipment 105*b*. The processing means may fetch map data from the map database 103*a* and transmit the same to the user equipment 105*b* via OEM cloud 109 in a format suitable for use by the one or both of the user equipment 105*a* and/or the user equipment 105*b*. In one or more example embodiments, the mapping platform 103 may periodically communicate with the user equipment 105*a* and/or the user equipment 105*b* via the processing server 103*b* to update a local cache of the map data stored on the user equipment 105*a* and/or the user equipment 105*b*. Accordingly, in some example embodiments, the map data may also be stored on the user equipment 105*a* and/or the user equipment 105*b* and may be updated based on periodic communication with the mapping platform 103.

In some example embodiments, the user equipment 105*a* and the user equipment 105*b* (hereinafter, also referred to as "the user equipment 105*a*, 105*b*") may be any user accessible device such as a mobile phone, a smartphone, a portable computer, and the like that are portable in themselves or as a part of another portable/mobile object such as a vehicle. The user equipment 105*a*, 105*b* may comprise a processor, a memory, and a communication interface. The processor, the memory and the communication interface may be communicatively coupled to each other. In some example embodiments, the user equipment 105*a*, 105*b* may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example embodiments, the user equipment 105*a*, 105*b* may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 105*a*. 105*b*. Additional, different, or fewer components may be provided. For example, the user equipment 105*a*, 105*b* may be configured to execute and run mobile applications such as a messaging application, a browser application, a navigation application, and the like. In one embodiment, at least one user equipment such as the user equipment 105*b* may be directly coupled to the system 101 via the network 107. For example, the user equipment 105*b* may be a dedicated vehicle (or a part thereof) for gathering data for development of the map data in the database 103*a*. In some example embodiments, at least one user equipment such as the user equipment 105*b* may be coupled to the system 101 via the OEM cloud 109 and the network 107. For example, the user equipment 105*b* may be a consumer vehicle (or a part thereof) and may be a beneficiary of the services provided by the system 101. In some example embodiments, one or more of the user equipment 105*a* and 105*b* may serve the dual purpose of a data gatherer and a beneficiary device. The user equipment 105*a* or 105*b* may be configured to capture sensor data associated with a road which the user equipment 105*a*, 105*b* may be traversing. The sensor data may for example be image data of road objects, road signs, or the surroundings (for example buildings). The sensor data may refer to sensor data collected from a sensor unit in the user equipment 105*a* and/or user equipment 105*b*. In accordance with an embodiment, the sensor data may refer to the data captured by the vehicle using sensors. The one or more user equipment 105*a*, 105*b* may be communicatively coupled to the system 101, the mapping platform 103 and the OEM cloud 109 over the network 107.

The network 107 may be wired, wireless, or any combination of wired and wireless communication networks, such as cellular, Wi-Fi, internet, local area networks, or the like. In one embodiment, the network 107 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an embodiment the network 107 is coupled directly or indirectly to the user equipment 105*b* via OEM cloud 109. In an example embodiment, the system may be integrated in the user equipment 105*b*. In an example, the mapping platform 103 may be integrated into a single platform to provide a suite of mapping and navigation related applications for OEM devices, such as the user devices and the system 101. The system 101 may be configured to communicate with the mapping platform 103 over the network 107. Thus, the mapping platform 103 may enable provision of cloud-based services for the system 101, such as, storing the lane marking observations in the OEM cloud 109 in batches or in real-time.

FIG. 2 illustrates a block diagram of the system 101 for generating map data, in accordance with an example embodiment. The system 101 may include a processing means such as at least one processor 201 (hereinafter, also referred to as "processor 201"), storage means such as at least one memory 203 (hereinafter, also referred to as "memory 203"), and a communication means such as at least one communication interface 205 (hereinafter, also referred to as "communication interface 205"). The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

In some embodiments, the processor 201 may be configured to provide Internet-of-Things (IOT) related capabilities to users of the system 101, where the users may be a traveler, a rider, a pedestrian, and the like. In some embodiments, the users may be or correspond to an autonomous or a semi-autonomous vehicle. The IoT related capabilities may in turn be used to provide smart navigation solutions by providing real time updates to the users to take pro-active decision on turn-maneuvers, lane changes, overtaking, merging and the like, big data analysis, traffic redirection, and sensor-based data collection by using the cloud based mapping system for providing navigation recommendation services to the users. The system 101 may be accessed using the communication interface 205. The communication interface 205 may provide an interface for accessing various features and data stored in the system 101. The communication interface may comprise a display interface based on a touch input, and configured for displaying a 2D map. In some embodiments, such the system 101 provides the 2D map to one or more user equipment 105*a*, 105*b*, which are the configured to display the 2D map on a user interface associated with the one or more user equipment 105*a*. 105*b*. Further, from the one or more user equipment, 105*a*, 105*b*, at least one marked-up location on the 2D map is received. For example, the user places a marker (also referred to as a deterrent marker (by touching a location on the displayed 2D map, when the user interface associated with one or more user equipment 105*a*, 105*b* is a touch based interface. The location may be associated with the region for which the user wants to provide their preference about routing or not routing of traffic. Then based on the user's marked location, an output contribution value or a value is determined for the marked up location. The one or more user equipment 105*a*, 105*b* may transmit the user's marked up location, where the processor 201 may be configured for assigning, to the user preference data, an output contribution value based on the received marked-up location.

Additionally, or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. The memory 203 may also be configured to maintain data about user responses about various location on the 2D map for calculating output contribution values. In some embodiments, the memory 203 stores a heatmap of user preference data and its contribution values. For example, the heatmap comprises different location corresponding to a region on the 2D map associated with different votes where each vote can be placed on the 2D map. This heatmap would aggregate votes so that more votes would push the value at a location on the map higher. A location with no votes would be zero. The path planning apps for vehicles would take this information into account and route traffic away from hot/high-vote locations.

As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The communication interface 205 may comprise input interface and output interface for supporting communications to and from the user equipment 105*a*, 105*b* or any other component with which the system 101 may communicate. The communication interface 205 may be any means such as a device or circuitry embodied in either hardware or a combination of hardware and software that is configured to receive and/or transmit data to/from a communications device in communication with the user equipment 105*a*, 105*b*. In this regard, the communication interface 205 may include, for example, an antenna (or multiple antennae) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms for enabling the system 101 to carry out information exchange functions in many different forms of communication environments.

FIG. 3 illustrates an exemplary scenario 300 of a working example of the system 101, exemplarily illustrated in FIG. 1, for generating map data, in accordance with an example embodiment. FIG. 3 is explained in conjunction with FIG. 1 and FIG. 2. There is shown a market area 301, a school 303, a hospital 305, residential area 307, a road 309 diverged into different roads such as a first road 309*a*, a second road 309*b*, a third road 309*c*, a fourth road 309*d*, a fifth road 309*e* and sixth road 309*f*, and the complete region is divided into different zones such as a first zone 311, a second zone 313, a third zone 315, and a fourth zone 315.

In accordance with an embodiment, the system 101 may obtain zone information. For example, zones may be geofenced areas, or zones may be manually marked, or zones may be created automatically, or zones may change with time. For example, the region may be divided into different one or more zones such as 311, 313, 315 and 317 based on one or more factors.

In an embodiment, system 101 may obtain starting point and ending point information for route based on a navigation route request from a user and will generate a path plan for the user. The system 101 may condition the path plan on the start and the end point. The system 101 may obtain user preference data associated with each zone from the user equipment 105*a* and 105*b*. The system may determine aggregate values for different zones 311, 313, 315 and 317 and plan the route for navigation of the user based on the aggregate values for different zones. The system 101 may suppress generating route through those zones which have aggregate value than a threshold aggregate value, even though the route through those zones forms an optimal route and less congested route. On the other hand, the system 101 freely considers those zone for route planning and navigation instruction generation which have the aggregate value lesser than the threshold aggregate value.

In an embodiment, the system 101 may allow users to place map markers as a way to deter traffic from passing through one or more zones 311, 313, 315, and 317. For example, the system 101 may provide a 2D map associated with the path or route for displaying on a user interface associated with the user equipment 105*a* and/or 105*b*. The system 101 may further receive at least one marked-up location on the 2D map from the user. In an embodiment, the at least one marked-up location comprises one or more markers placed on a location associated with the region. The system 101 may further determine a marked circular region centered around the marked-up location and having a predefined radius. The marked circular region defines a predefined boundary associated with a disc with the predefined radius, to which the user's preference data and its output contribution value is applied. The user may be able to move the one or more markers for the marked-up location anytime and subsequently a new disc is calculated. This will be explained in greater detail in conjunction with FIG. 4A and FIG. 4B. In this manner, the user may be able to provide user preference data or votes, for any location within any of the zones 311, 313, 315 and 317.

In an embodiment, the users may vote only one vote each that would be placeable onto the map as a point with a fixed radius. And within the radius the vote count may increase with +1. The user may, at any time, move this point.

In another embodiment, the system 101 may allow users to place multiple smaller radius points instead of just one larger point. This may allow the user to cover more intricate routes instead of a large area with a simple disc. The total area of the N smaller disks would be limited to be the same total area as the single larger disk from before.

The system 101 may further assign an output contribution value based on the comparison to the user preference data. In an embodiment, the output contribution value is considered a predetermined positive mathematical value (such as +1) associated with an indication of not routing traffic through the region (such as a zone) associated with the marked-up location In another embodiment, the output contribution value is considered a predetermined null value, when no vote is received for the region.

The system 101 may further calculate the aggregated value based on the output contribution. Based on the aggregated value the system 101 may generate the map data for different regions. The map data may be in the form of a heatmap indicative of the calculated aggregate value for each of a plurality of map regions, which further comprise each of the regions or zones 311, 313, 315 and 317. Based on the map data, the system 101 may further be configured to generate navigation instructions for routing or not routing of traffic through each of the zones 311, 313, 315, and 317. For example, a plurality of users in the region (or zone) 313, which has the school 303 as well as the hospital 305 within zone 313, may desire that navigation apps should not unnecessarily route noisy traffic through their zone 313 and maintain peace and silence in the zone 313. Thus, these users may open the navigation app provided by the system 101 on their mobiles devices, such as user equipment 105*a*, 105*b* and open the 2D map for the zone 313. Then based on their own locations or preference, they put location markers at different locations within the zone 313. In some embodiments, these location markers are assigned a vote value of "+1". Further, the aggregate value of the zone 313 is calculated by aggregating all the votes within the zone 313. The aggregate value of the zone 313 is then compared to the threshold aggregate value. If the aggregate value of the zone 313 is more than the threshold aggregate value, then map data for not routing traffic through the zone 313 is generated. This map data may be in the form of a navigation instruction, which will be provided when any vehicle's route of travel passes through zone 313. Thus, based on this navigation instruction, the route of travel may be altered, and the vehicle may be redirected through another route, to avoid passing through the zone 313.

In some embodiments, the system 101 may generate map data comprising a heat map for each of a plurality of map regions 311, 313, 315, and 317 based on their respective aggregated values. These heatmaps may be stored in the map database 103*a* and may be used while planning of any navigation route by the system 101.

In some embodiments, the users marked-up locations within the zone, such as zone 313, is used to form small disks of predetermined radius and are used to define marked circular regions centered around the marked-up locations. Area of these small disks is combined to form a larger disk with an area same as combined area of the smaller disks. This may help the users to cover more intricate routes instead of a larger route. For example, the use could place location markers with small radius circles near the school 303 in the zone 313. These smaller radius circles could then be combined to form a region near the school 303 that is to be excluded from navigation services and traffic routing considerations. The remaining region in the zone 313 may still be used for routing of traffic.

In some embodiments, the users might be given an area budget for placing the location markers on the 2D map. For example, while registering with the navigation app associated with the system 101, the users may be able to choose a type of user, a type of plan, a type of account and the like, for the navigation app. Based on this, the user may be assigned an area budget. The area budget may be used to further determine how much times or for how many locations the user can vote on the navigation app. A larger area budget may give more votes for users to make, while lower area budget may give only a single vote privilege to the user. Based on the area budget, and using their user equipment (such as 105*a* or 105*b*), the user may be able to place on or more location markers for voting. Further, based on the area budget, the user's votes may be accordingly received and processed by the navigation app and/or the system 101. When the user's area budget is more than a threshold area budget, they are allowed to place the one or more markers (or location markers). When the user's area budget is lesser than the threshold area budget, they are not allowed to place the one or more markers (or location markers). In such a case, the user may be required to redeem or recharge their subscription with the system 100, to get more area budget allotted to them, if they wish to continue voting further for traffic redirection privileges using the navigation app or the system 100.

In an embodiment, the system 101 may further generate a visual representation of a heatmap based on the vote density representing a heatmap indicative of the calculated aggregate value for each of a plurality of map regions, 311-317, wherein the plurality of map regions comprises the region 313 (explained in detail in FIGS. 4A-4B).

Based on the generated heatmap, the system 101 may further transmit the generated heatmap to the one or more user equipment, such as user equipment 105*a* or user equipment 105*b*. The heatmap may be used to generate a visualization of votes for displaying on a display associated with the one or more user equipment. Alternatively, the heatmap may only be stored in the memory of the one or more user equipment and may be used during processing of user preference data to determine aggregate value for one or more regions in the heatmap. In some embodiments, the heatmap may be used to transmit a navigation instruction to the one or more user equipment (such as 105*a* or 105*b*) for navigating through a route not involving high voted areas (regions with high aggregate value) in the heatmap. In alternate embodiments, the system 101 uses the generated heatmap to suppress sending a navigation instruction to the one or more user equipment (such as 105*a* or 105*b*). For example, the navigation instruction may include sending a route or a turn maneuver to the one or more user equipment (105*a* or 105*b*) involving a region with high aggregate value in the generated heatmap. So, the system 101 suppresses this instruction and sends next or subsequent instruction not including the region with high aggregate value. In this manner, the generated heatmap is used to redirect traffic away from high aggregate value regions based on user preference data collected by the system 101.

In some embodiments, the system 101 updates the map database 103*a* based on the generated routing information, the generated heatmap and user preference data. As already discussed earlier, the user preference data may be collected using the navigation app installed on the user's mobile device (such as user equipment 105*a* or user equipment 105*b*).

FIG. 4A illustrates an exemplary user interface 400*a* for receiving user preference data, in accordance with an example embodiment.

The exemplary user interface 400*a* illustrates a map of a region for which the user wishes to provide their preference data. The map may be displayed after the user opens a navigation app installed on their user equipment (105*a* or 105*b*) and opens a function of the navigation app which allows them to specify their preference for traffic redirection. Then, the user may be shown a 2D map, such as the map displayed in FIG. 4A and the user may navigate on the map to their desired region. In some embodiments, the map may be even a 3D map which incorporates all features on the 2D map displayed in FIG. 4A, without deviating from the scope of the present disclosure. The user interface 400*a* may be a touch based user interface in the example illustrated in FIG. 4A, and the user may navigate to their region of choice by any type of input operation such as scrolling, dragging, pinching, zooming in, zooming out, tilting and the like. It may be understood by a person of ordinary skill in the art that the touch based user interface 400*a* is shown in FIG. 4A only for exemplary purpose. In practice, any other type of input interfacing may be possible, which allows a user to specify a location of interest, without deviating from the scope of the present invention.

Once the user has selected or navigated their desired region, the user may place a marker on the map, such as by touching a specific location on the user interface 400*a*, to specify a marked-up location 401. The marked-up location 401 may then be assigned with an output contribution value, or a vote value, based on the user's placement of the marker. The output contribution value may be a positive mathematical value, such as "+1", which indicates one vote for the marked-up location 401 for not routing traffic through the marked-up location 401. Thus, the marker serves as a deterrent marker in a way, to act as a deterrent for routing of traffic through the marked-up location 401 and an associated region around the marked-up location 401. To identify the region around the marked-up location 401 for not routing of traffic, the marked-up location 401 may be used to define a circular region 405 having a predefined radius 403 and center of the circular region 405 is the marked-up location 401 itself. In this way, the user preference data about the marked-up location 401, as obtained through the user interface 400*a* their user equipment (105*a* or 105*b*), is used to obtain user preference data for the region 405. The user preference data is in the form of a vote having an output contribution value, such as a mathematical value of "+1", which contributes towards calculating an aggregate value for the region 405, based on user preference data obtained from a plurality of users. Further, the aggregate value may then be used to generate map data indicative of the calculated aggregate value for the region. The map data may be in any of a plurality of forms, such as map data records, navigation instruction data, navigation data record, or heatmap data. The generated map data may be stored in map database 103*a*. Alternately, the generated map data may be stored in the one or more user equipment 105*a* or 105*b*. Alternately, the generated map data in the form of a heatmap based on the heatmap data, may be displayed to the user on a user interface.

FIG. 4B illustrates an exemplary user interface 400*b* for displaying a heatmap of regions in accordance with an example embodiment. It may be noted that the user interface 400*b* presents a display of the heatmap data in the form of a heatmap having regions with varying volume data only for exemplary purpose to ease the understanding of the inventive systems disclosed herein. In various implementations of the heatmap, the heatmap data may not be actually presented on the display, but used in the form of a data record storing data about different regions and their associated volume or intensity with respect to a predefined parameter. For example, the heatmap shown on user interface 400*b* displays three regions, a region 405 in a dark first shade, a region 407 in a light second shade, and a region 409 in a lightest third shade to show three different regions having three different aggregate values of user preference data. Here, the region 405 has received maximum number of votes from users and thus had highest aggregate value, the region 407 has received second highest number of votes from users and thus had second highest aggregate value represented by the light second shade and the region 409 has received least number of votes from users and thus has lowest aggregate value represented by lightest third shade. The three regions 405, 407 and 409 are shown here only for exemplary purpose and any number or variations of regions may be possible without deviating from the scope of the present invention.

In some embodiments, as already discussed, when the users vote for a particular region out of the regions 405-407, such as by using the navigation app installed on their user equipment, more votes push the aggregate value of the region higher on the map (such as the 2D map displayed on the user interface 405*b*). However, regions with no votes have aggregate value zero. This information is used by the system 101 while generating navigation instructions and path planning for vehicles, so that traffic can be routed through different regions according to their respective aggregate value. For example, traffic may be allowed to pass through the region 409, but not through the region 405. In fact, traffic may be routed away from the region 405, due to its high aggregate value (higher than the threshold aggregate value specified earlier), indicating preference of more users to not allow traffic through the region 405. For example, the region 405 may be a residential area, and more and more residents of the region 405 may vote for routing traffic away from the region 405, to maintain peace and safety within the residential area.

In some embodiments, each user may be allotted an area budget for allowing them to vote a single time or more times for any location on the 2D map displayed on the user interface 400*b* associated with their user equipment (such as 105*a* or 105*b*). At the time of placing location markers on the 2D map, the area budget of the user is first checked. If it is more than a threshold area budget, the user is allowed to vote and place the location marker. When the area budget is lesser than the threshold area budget or is zero, the user in not allowed to vote. In this case, an error message may be displayed to the user on their user equipment, stating, "Insufficient area balance. Voting not allowed. Please recharge your account to continue". Then the user may decide to get more area budget by one of recharging a user account registered with the system 101 (or the navigation app), redeeming some bonus coupons, using some rewards as a reward code and the like. Alternately the user may decide to abandon the voting if they do not wish to get more area budget added to their user account. Based on the area budget, the user may be allowed only one vote each that would be placeable onto the map as a point with a fixed radius. Within the fixed radius would produce a vote value of +1. The user may, at any time, move this point.

In some embodiments, the user may be allowed to vote multiple times by placing multiple smaller radius points (or markers) on the 2D map, instead of just one larger point. This may enable the user to cover more intricate routes instead of a large area with a simple disc. The total area of N smaller disks formed by the smaller radius points may be limited to be the same total area as the single larger disk having the predefined radius (such as regions 405-407) from before. Further, as stated previously, the users may be granted a larger area budget to be used for voting multiple times, via sign-up bonus, rewards for contributing to a swarm mapping program/data access via the navigation app, or might simply be purchased, in-app, by the user.

In an alternate embodiment, the total area budget may be limited to allow voting count inside a larger area disk to be increased by allowing the user to vote multiple times within a single larger disk, such as any of the regions 405-409.

Thus, using the various voting methodologies discussed above to specify user preference data, the map data may be generated to take this user preference data. Subsequently, the generated map data is used for allowing or not allowing traffic through a region on the map, based on the aggregate value of the user preference data in the region.

FIG. 5 illustrates a flow diagram of a method 500 for generating map data in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 500 illustrated by the flowchart diagram of FIG. 5 is generating map data. Fewer, more, or different steps may be provided.

At step 501, the method 500 comprises obtaining, from one or more user equipment (105*a* or 105*b*), user preference data associated with a region. The region may be any geographical region on a map, such as a 2D map, and the region may be identified by specifying a location on the 2D map and generating a circle around the location with a predetermined radius. Then the circle becomes the region for which the user preference data is considered. The user preference data is associated with an indication of at least one of routing of traffic through the region or not routing of traffic through the region. To that end, the user preference data comprises a vote value for indicating whether to allow routing of traffic through the region or to not allow routing of traffic through the region. The vote value may be a positive mathematical value, such as "+1". Each such vote value forms an output contribution value which is contributing towards generating of map data indicative of user preference data. Further, the output contribution value which is contributing towards generating of map data indicative of user preference data for generating of navigation instructions based on the generated map data.

The user preference data is obtained by providing, the 2D map for displaying on a user interface (such as the user interface 405*a* or the user interface 405*b*) associated with the one or more user equipment (105*a* or 105*b*). The 2D map may be provided by the system 101 to the one or more user equipment (105*a* or 105*b*) for displaying and obtaining user preference data. Alternately, the 2D map may be stored in the one or more user equipment (105*a* or 105*b*) when the system 101 is envisaged as the one or more user equipment (105*a* or 105*b*). The system 101 may be then configured to receive, from the one or more user equipment (105*a* or 105*b*), at least one marked-up location on the 2D map, such as the location 401 on the user interface 400*a*, wherein the at least one marked-up location comprises: one or more markers placed on the location associated with the region, displayed on the 2D map. Further, based on the received marked-up location, the user preference data is assigned an output contribution value (such as the vote value of "+1). To that end, the marked-up location, such as the location 401, is used to define a marked circular region having a predefined radius, such as the region 405 with the radius 403. In some embodiments, the marked-up location is used to define the region with an output contribution value based on the area budget disclosed in conjunction with FIG. 4B.

At step 503, the method 500 comprises calculating, by a processor (such as the processor 201 associated with the system 101), an aggregate value for the region, such as the region 405 illustrated in FIG. 4A or any of the regions 405-409 illustrated in FIG. 4B, based on the obtained user preference data. For example, multiple users may provide their user preference data for the region 405. Each user's user preference data is calculated as a vote with the output contribution value as "+1". Then, all these values are aggregated to provide the aggregate value for the region 405. If 50 users vote for the region 405, then the aggregate value for the region 405 becomes 50 votes. Similarly, aggregate values may be calculated for other regions (the region 407 and the region 409) in the map. In some embodiments, the aggregate value is obtained based on a simple summation function as discussed above. In some other embodiments, any form of aggregation function may be used to determine the aggregate value for the region, such as including but not limited to average function, integration function, median function, mode function and the like, without deviating from the scope of the present disclosure.

At step 505, the method comprises generating map data indicative of the calculated aggregate value for the region. The method further comprises providing the generated map data to the one or more user equipment for generating routing information or a navigation instruction for routing of traffic through the region or not routing of traffic through the region. For example, the aggregate value for any region may be compared with the threshold aggregate value discussed previously. Then the navigation instruction is generated for routing the traffic the region when the aggregate value for the region is lesser than the threshold aggregate value. However, the navigation instruction is either suppressed or is generated to ensure that the traffic is not routed through the region when the aggregate value is greater than the threshold aggregate value.

In some embodiments, the map data indicative of the calculated aggregate value for the region further comprises generating a heatmap indicative of the calculated aggregate value for each of the plurality of map regions, such as the region 405-409 illustrated in FIG. 4B, wherein the plurality of map regions comprises the region 405.

In some embodiments, the generated heatmap is be transmitted to the one or more user equipment (105*a* or 105*b*) by the system 101.

In some embodiments, the generated heatmap is stored by the system 101 in the form of a data record and used to transmit the navigation instruction to the one or more user equipment (105*a* or 105*b*). For example, the generated heatmap may be stored in the map database 103*a* and may be used by the system 101 to generate one or more navigation instructions provided by the mapping platform 103.

In some embodiments, the generated heatmap is used to suppress sending a navigation instruction for the one or more user equipment (105*a* or 105*b*) based on the aggregate value of the region. For example, the region 405 having high aggregate value (higher than the threshold value), is not to be considered for routing if traffic. So, if the system 101 has a navigation instruction involving a passage of a vehicle or the traffic through the region 405, this navigation instruction is suppressed. Alternately, a redirected route may be calculated for redirecting traffic away from the region, and navigation instructions for that route may be sent to the one or more user equipment (105*a* or 105*b*).

In this manner, the method 500 may be configured to enable redirection of traffic away from highly voted areas or regions, based on user specified preferences, in a real-time, crowd-sourced, and reliable manner.

The method 500 may be implemented using corresponding circuitry. For example, the method 500 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 500.

In an example embodiment, an apparatus for performing the method 500 of FIG. 5 above may comprise a processor (e.g., the processor 201) configured to perform some or each of the operations of the method of FIG. 4 described previously. The processor may, for example, be configured to perform the operations (501-505) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (501-505) may comprise, for example, the processor 201 which may be implemented in the system 101 and/or a device or circuit for executing instructions or executing an algorithm for processing information as described above.

In this way, example embodiments of the disclosure results in generating routing information. The invention provides alternate route and avoids highly voted areas specified by user preference data gathered from multiple users. The disclosure also provides visual representation using heat map based on the vote density in the region. To that end, the various embodiments of the present disclosure help the user to follow routes which are free from congestion and avoids areas where safety or peace may be of more concern, for example school, residential areas, parks, and hospitals. This disclosure helps the end-user to have a say in allowing or not allowing traffic to pass through their regions of choice and thus to avoid disturbing people in residential areas. Along with this, the various embodiments disclosed help to avoid accident like situations in residential areas, school, hospitals, because vehicles are not provided the routes which encompass these areas.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method for generating map data, the computer-implemented method comprising:

rendering a map in a user interface on a display of one or more user equipment;

receiving, from the one or more user equipment, at least one marked-up location on the map via the user interface;

obtaining, from the one or more user equipment, user preference data from one or more residents of a region based on the at least one marked-up location, wherein the plurality of residents is separate from a user of at least one subsequent vehicle, wherein the user preference data comprises a vote value for not routing of the traffic through the region, and wherein the traffic is comprised of the at least one subsequent vehicle traveling in the region;

calculating, by a processor, an aggregate value for the region based on the vote value;

generating map data indicative of the calculated aggregate value for the region; and generating a navigation instruction that does not route the traffic through the region based on the calculated aggregated value for the region.

2. The method of claim 1, wherein generating the navigation instruction comprises:

comparing the aggregate value for the region with a threshold aggregate value; and generating the navigation instruction based on the comparison, wherein the traffic is routed through the region when the aggregate value for the region is lesser than the threshold aggregate value and the traffic is not routed through the region when the aggregate value is greater than the threshold aggregate value.

3. The computer-implemented method of claim 1, wherein the vote value is a predetermined positive value, which is associated with a marked circular region having a predefined radius and wherein the marked circular region is centered around the at least one marked-up location.

4. The computer-implemented method of claim 1, wherein receiving, from the one or more user equipment, the at least one marked-up location on the map comprises:

determining area budget data associated with a user of the one or more user equipment; and receiving the at least one marked-up location on the map based on the determined area budget data associated with the user, wherein the user is allowed to place one or more markers on the location associated with the at least one marked-up location when the area budget data is more than a threshold area budget value.

5. The method of claim 1, wherein generating map data indicative of the calculated aggregate value for the region further comprises generating a heatmap indicative of the calculated aggregate value for each of a plurality of map regions, wherein the plurality of map regions comprises the region.

6. The method of claim 5, further comprising transmitting the generated heatmap to the one or more user equipment.

7. The method of claim 5, further comprising transmitting the navigation instruction for the one or more user equipment based on the generated heatmap.

8. The method of claim 5, further comprising suppressing the navigation instruction for the one or more user equipment based on the generated heatmap and aggregate value of the region.

9. A system for generating map data, the system comprising:

a memory configured to store computer executable instructions; and one or more processors configured to execute the instructions to:

obtain, from one or more user equipment, user preference data from one or more residents of a region, wherein the plurality of residents is separate from a user of at least one subsequent vehicle, wherein the user preference data comprises a vote value for not routing of the traffic through the region, and wherein the traffic is comprised of the at least one subsequent vehicle traveling in the region;

calculate, by a processor, an aggregate value for the region based on the vote value;

generate map data indicative of the calculated aggregate value for the region; and generate a navigation instruction that does not route the traffic through the region based on the calculated aggregated value for the region.

10. The system of claim 9, wherein the one or more processors is further configured to:

compare the aggregate value for the region with a threshold aggregate value; and generate the navigation instruction based on the comparison, wherein the traffic is routed through the region when the aggregate value for the region is lesser than the threshold aggregate value and the traffic is not routed through the region when the aggregate value is greater than the threshold aggregate value.

11. The system of claim 9, wherein to obtain the user preference data associated with the region the one or more processors are further configured to:

provide, to the one or more user equipment, a 2D map for displaying on a user interface associated with the user equipment;

receive, from the one or more user equipment, at least one marked-up location on the 2D map, wherein the at least one marked-up location comprises: one or more markers placed on a location associated with the region, displayed on the 2D map; and compare, with a predefined distance threshold, a distance between the at least one marked-up location and a predefined boundary associated with the region.

12. The system of claim 9, wherein the vote value is a predetermined positive value, which is associated with a marked circular region having a predefined radius and wherein the marked circular region is centered around the at least one marked-up location.

13. The system of claim 11, wherein to receive, from the one or more user equipment, at least one marked-up location on the 2D map, the one or more processors is further configured to:

determine area budget data associated with a user of the one or more user equipment; and receive the at least one marked-up location on the 2D map based on the determined area budget data associated with the user, wherein the user is allowed to place one or more markers on the location associated with the at least one marked-up location when the area budget data is more than a threshold area budget value.

14. A non-transitory computer programmable product comprising a non-transitory computer readable medium having stored thereon computer executable instruction which when executed by one or more processors, cause the one or more processors to carry out operations for generating map data, the operations comprising:

obtaining, from one or more user equipment, user preference data from one or more residents of a region, wherein the plurality of residents is separate from a user of at least one subsequent vehicle, wherein the user preference data comprises a vote value for not routing of the traffic through the region, and wherein the traffic is comprised of the at least one subsequent vehicle traveling in the region;

calculating an aggregate value for the region based on the vote value;

generating map data indicative of the calculated aggregate value for the region; and generating a navigation instruction that does not route the traffic through the region based on the calculated aggregated value for the region.

* * * * *